United States Patent
Mihály et al.

(10) Patent No.: US 9,438,526 B2
(45) Date of Patent: Sep. 6, 2016

(54) NETWORK CONTROLLED CLIENT CACHING SYSTEM AND METHOD

(75) Inventors: Attila Mihály, Dunakeszi (HU); Lars Westberg, Enköping (SE); Xuejun Cai, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/358,492

(22) PCT Filed: Dec. 16, 2011

(86) PCT No.: PCT/IB2011/003074
§ 371 (c)(1),
(2), (4) Date: Mar. 4, 2015

(87) PCT Pub. No.: WO2013/088186
PCT Pub. Date: Jun. 20, 2013

(65) Prior Publication Data
US 2015/0372933 A1    Dec. 24, 2015

(51) Int. Cl.
*H04L 1/00* (2006.01)
*H04L 12/875* (2013.01)
(Continued)

(52) U.S. Cl.
CPC ........... *H04L 47/56* (2013.01); *H04L 67/2847* (2013.01); *H04L 67/325* (2013.01);
(Continued)

(58) Field of Classification Search
CPC ... H04W 72/04; H04W 72/05; H04W 72/06; H04W 84/08; H04W 84/09; H04W 84/10; H04W 84/12; H04W 84/13; H04W 84/14; H04W 84/15

USPC ........ 370/329, 328, 341, 343, 351, 229, 230; 455/414.1, 418, 550.1, 422.1
See application file for complete search history.

(56) References Cited

U.S. PATENT DOCUMENTS

| | | |
|---|---|---|
| 7,013,149 B2 | 3/2006 | Vetro et al. |
| 2005/0209927 A1 | 9/2005 | Aaltonen et al. |

(Continued)

FOREIGN PATENT DOCUMENTS

WO    03/055168 A2    7/2003

OTHER PUBLICATIONS

International Search Report issued in corresponding International application No. PCT/IB2011/003074, date of mailing Sep. 10, 2012.
(Continued)

*Primary Examiner* — Dady Chery
(74) *Attorney, Agent, or Firm* — Patent Portfolio Builders PLLC (57) ABSTRACT

A communication system, cache, computer readable medium and method for exchanging delay-tolerant data content or in-advance data content (19) between a user terminal (12) and a communication network (14) with which the user terminal (12) communicates. The method includes storing the delay-tolerant data content or in-advance data content (19) into a network cache (18) of the communication network (14); gathering at the network cache (18) network information related to a status of the communication network (14); receiving user terminal information at the network cache (18) from a user cache (22) located at the user terminal (12); and transferring the delay-tolerant data content or in-advance data content (19) from the network cache (18) to the user cache (22) based on the network information and the user terminal information.

21 Claims, 10 Drawing Sheets

(51) Int. Cl.
- *H04L 29/08* (2006.01)
- *H04N 21/414* (2011.01)
- *H04N 21/433* (2011.01)
- *H04N 21/442* (2011.01)
- *H04N 21/45* (2011.01)
- *H04N 21/6371* (2011.01)
- *H04N 21/647* (2011.01)
- *H04N 21/658* (2011.01)
- *H04W 72/08* (2009.01)
- *H04W 72/10* (2009.01)

(52) U.S. Cl.
CPC .... *H04N21/41407* (2013.01); *H04N 21/4331* (2013.01); *H04N 21/4424* (2013.01); *H04N 21/4532* (2013.01); *H04N 21/6371* (2013.01); *H04N 21/64738* (2013.01); *H04N 21/64746* (2013.01); *H04N 21/6582* (2013.01); *H04W 72/085* (2013.01); *H04W 72/10* (2013.01); *H04L 67/04* (2013.01); *H04L 67/289* (2013.01); *H04L 67/2876* (2013.01)

(56) References Cited

U.S. PATENT DOCUMENTS

2005/0273514 A1   12/2005   Milkey et al.
2010/0267403 A1*  10/2010   Lungaro ............ H04L 67/2847
                                                 455/466

OTHER PUBLICATIONS

International Preliminary Report on Patentability issued in corresponding International application No. PCT/IB2011/003074, date of mailing Jun. 26, 2014.

* cited by examiner

NETWORK CONTROLLED CLIENT CACHING SYSTEM AND METHOD

TECHNICAL FIELD

The present invention generally relates to systems, software and methods and, more particularly, to mechanisms and techniques for transferring content between a user terminal and a network by taking into account various parameters of the user terminal and the network.

BACKGROUND

Today's cellular networks for wireless communication are required to support a large variety of content. Some examples of such content typically exchanged in a communication network include voice calls, video calls, small and large data files, streaming of audio and video and so on. In addition to the various forms of content, the networks have to deal with transferring the content at different times during the day and night. This leads to a highly fluctuating traffic volume during the day and night hours. Still further, the traffic volume also differs from one cell to the other.

Thus, when planning and designing capacity in a cellular network, the different peaks of traffic volume or load in the different cells in the network are taken into account in order to provide a reliable communication network that will, to a large extent, provide requested communication services to all the customers in each cell, also during peak hour traffic.

Because the communication networks are designed to provide or support requested communication services to all the customers in each cell, including the peak hour traffic, substantial capacity exists in the networks which remains unused during off-peak hours. During off-peak hours, the traffic volume or load is smaller, which means that the capacity which remains unused is wasted. This increases the cost of operating the communication network.

In order to smooth out the traffic volume or load over time, the radio network can control caching of information communication which need not be delivered in real-time.

One approach disclosed in U.S. Patent Application Publication No. 2010/0267403, the entire content of which is included herein by reference, uses client caching for radio optimization. However, this approach relies on the fact that the storage part of the client is owned and, thus, controlled by the network operator and not by the user. This concept is similar to the solutions used in fixed networks where the hard-disk of, for example, top-box, is partitioned in two parts. One part is controlled by the operator and the end-user cannot reach this part.

Other known proposal is to download the content to the client in the application layer. However, at the time of the present invention there are no possibilities to control the download from the network and, thus, there is no gain from a radio network perspective.

Still other methods have been suggested that take into account the subscribers' environmental conditions when delivering the content. One such architecture has been proposed in U.S. Pat. No. 7,013,149 (herein '149), the entire content of which is incorporated herein by reference. This method is based on a central entity, called Application Service Provider, that is provided in the core network and controls the delivery of multimedia services based, among others factors, on environmental information like, location parameters, network conditions, delivery capabilities, time parameters, and subscriber mobility characteristics. The environment information is reported by the mobile access network and/or a geo-location component.

However, there are some problems with the above-noted approaches as discussed next. A first problem is that a mobile device is an end-user owned equipment. In the fixed networks, the operator selects the type of set-top box that should be used to provide the service. This is not the case in the context of the mobile network. Thus, the operator cannot own a storage portion in the mobile device. Further, it is noted that the current application based approach cannot be used to optimize the radio network. The mobile client has no knowledge of the load in the network and the applications are not designed to consider these problems.

While the environment-aware architectures like the one proposed in '149 are capable to partially optimize the radio resources, because the control is located in the core network, it is not possible to provide quick feedback about the available radio resources in order to achieve a spectrum-efficient content scheduling.

Accordingly, it would be desirable to provide devices, systems and methods that avoid the afore-described problems and drawbacks.

SUMMARY

Assets as, for example, content, are desired to be provided from a network to the users or sometimes from the users to the network. Today, the amount of content that is exchanged between the users and the network is large. Thus, the networks are designed to accommodate this large traffic. However, the traffic volume in the network is highly fluctuating during day and night hours and within different cells. Estimation shows that substantial capacity exists in the network that currently is not used at low peak. If the network operator could have a mechanism to control the transfer of information, which can be transferred with a certain delay, significant improvement of the radio utilization may be achieved resulting in cost savings for the operator. In one embodiment, the content to be transferred can be either cached in-advanced at a user cache at the client, or the client waits to receive the desired content at a time decided by a network cache according to a load of the network and/or conditions of the user.

According to one exemplary embodiment, there is a method for exchanging delay-tolerant data content between a user terminal and a communication network with which the user terminal communicates. The method includes a step of storing the delay-tolerant data content into a network cache of the communication network; a step of gathering at the network cache network information related to a status of the communication network; a step of receiving user terminal information at the network cache from a user cache located at the user terminal; and a step of transferring the delay-tolerant data content from the network cache to the user cache based on the network information and the user terminal information.

According to still another exemplary embodiment, there is a communication network to which a user terminal is connected for exchanging delay-tolerant data content. The communication network includes a network cache configured to store the delay-tolerant data content and a pre-caching logic module. The pre-caching logic module is configured to execute the steps noted in the above paragraph.

According to yet another exemplary embodiment, there is a network cache in a communication network to which a user terminal is connected for exchanging delay-tolerant data content. The network cache includes a storage device configured to store the delay-tolerant data content and a pre-caching logic module. The pre-caching is configured to gather network information related to a status of the communication network, receive user terminal information from a user cache located at the user terminal, and decide when to transfer the delay-tolerant data content from the network cache to the user cache based on the network information and the user terminal information.

According to another exemplary embodiment, there is a method for exchanging delay-tolerant data content between a user terminal and a communication network with which the user terminal communicates. The method includes a step of storing the delay-tolerant data content into a user cache of the user terminal; a step of gathering at the network cache network information related to a status of the communication network; a step of receiving user terminal information at the network cache from a user cache located at the user terminal; and a step of deciding to transfer the delay-tolerant data content from the user cache to the network cache based on the network information and the user terminal information.

Thus, it is an object to overcome some of the deficiencies discussed in the previous section and to provide a mechanism that considers the needs of the user but also the condition of the network and makes a decision of when to transfer the content between the user and the network. One or more of the independent claims advantageously provides such a mechanism for spreading the traffic of the network in time. This mechanism will ensure that the content to be exchanged between the user and the network does not increase the load of the network when the network is at or close to its high peak.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a user cache provided in a user terminal, a network cache provided in a network to which the user terminal is connected, and an interface between the two caches.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

According to an exemplary embodiment, there is a method for exchanging delay-tolerant data content between a user terminal and a communication network with which the user terminal communicates. The method includes a step of storing the delay-tolerant data content into a network cache of the communication network. Prior to transferring the content, the network cache gathers network information related to a status of the communication network. Also, the network cache receives information about the user terminal from a user cache located at the user terminal. Based on the received information from the network and the user terminal, the network cache decides when to transfer the delay-tolerant data content. Delay-tolerant data content may include any content that does not need to be transferred instantaneously, e.g., content that is not time sensitive.

Figure 1:
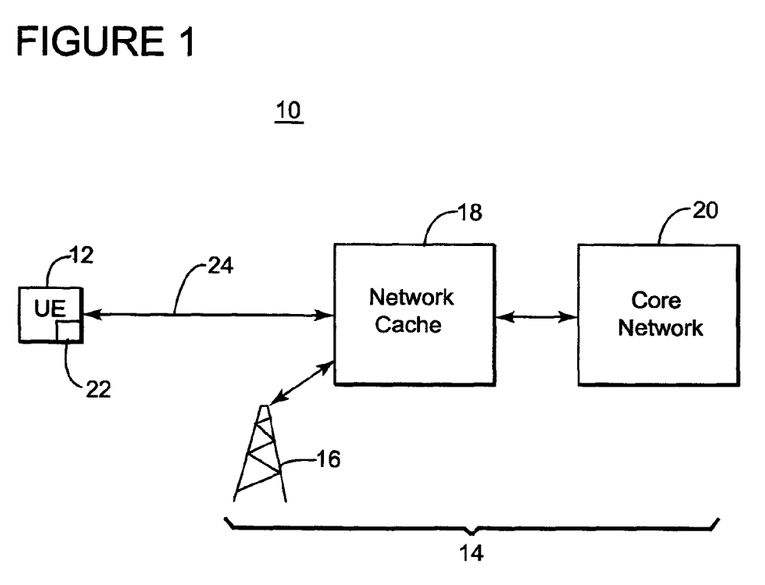
FIG. 1 is a schematic diagram of a communication network having a network cache and a user cache according to an exemplary embodiment.

The above noted method may be implemented according to an exemplary embodiment illustrated in FIG. 1. FIG. 1 shows a system 10 that includes a user terminal UE 12 and a communication network 14. The communication network includes, among other things, a base station 16, a network cache 18 and a core network 20. The network cache 18 is located so that it can directly communicate (e.g., has an interface to the base station) with the base station 16 to receive radio information in a quick manner.

The user terminal 12 is configured to include a user cache 22 that may be used by multiple applications residing in the user terminal. It is noted that the user cache 22 is not owned or controlled by the operator of the network. An interface 24 between the user cache and the network cache is configured to transfer the delay-tolerant data content.

The existence of a user cache makes it possible to transfer the content from the network to the user whenever is best from the radio and client perspective. Typical use cases include but are not limited to delay-tolerant data transfer, i.e., the content is transferred after the request from the user, when the radio conditions allow such transfer. Generally, a delivery deadline related to the content transfer may be specified by the user. The content should be transferred before the deadline. Another use includes content pre-fetch, i.e., content that is transferred to the user cache prior to be requested (or "consumed") by the user. Another use is the delayed upload of content from the user terminal to the network. This approach is useful due to the limited uplink radio resources, and may become increasingly important with the increased popularity of social networks with a large amount of user generated content. Thus, when a user wants to upload content to the network, the user terminal informs the network about this need. The network cache determines, based on the conditions of the network and the condition of the user terminal at what time to initiate the upload. Still, another use is terminal content back-up and sync, which will be discussed later.

Figure 2A:
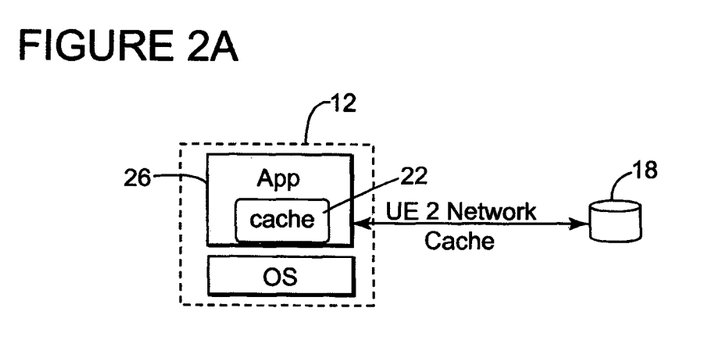
FIGS. 2A-C are schematic diagrams illustrating various modes of implementing a user cache in a mobile user terminal according to exemplary embodiments.
Figure 2B:
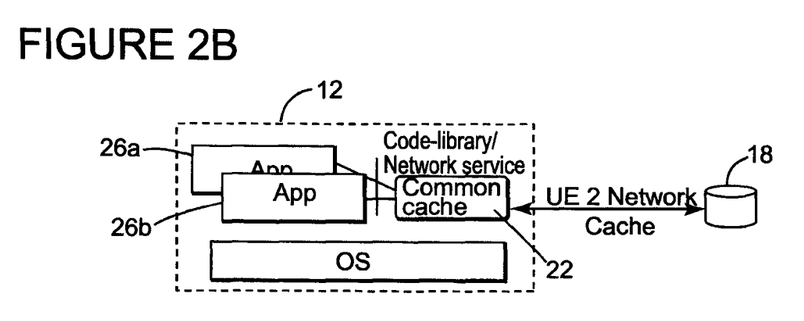
Figure 2C:
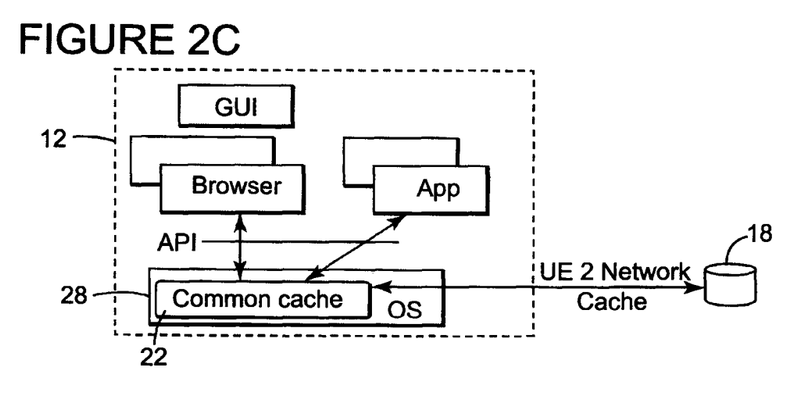

The user terminal 12 may be any type of mobile equipment, i.e., laptop with wireless communication, smartphone, tablet, etc. A high-level internal user terminal architecture and various possible implementations of the user cache are shown in FIGS. 2A-C. FIG. 2A shows the user cache 22 being implemented as part of a specific application 26 using a proprietary interface. An advantage of this implementation is the fast deployment (new applications appear every year), but the expected gain is less due to fewer supported applications. FIG. 2B shows the user cache 22 being implemented as a part of the application support. This architecture would result in a user cache available for multiple applications 26a-b, thus enhancing the radio gain, and still can be deployed relatively fast. FIG. 2C shows the user cache 22 being implemented as part of the operating system 28. A disadvantage of this implementation is the slow deployment into a new OS-version. However, this implementation requires cooperation between large operators, device-vendors and operating system (OS) providers.

Irrespective of which of the above implementations of the user cache is selected, a common characteristic of them is that the user cache it is not "owned" or controlled by the operator in the way proposed by US 2010/0267403. That is, the user cache takes individual decisions of what to cache, based on the user requests, which are conveyed to the network cache either through its own graphical user interface (GUI) or through interfacing with local applications as discussed later. Thus, although the network cache controls when to transfer the content between the network and the user terminal, the selection of the content to be transferred is also based on the user's preferences and/or requests.

The user (e.g., user cache) may also influence the content transfer by sending information to the network cache that specifies the conditions when this should happen. For example, the user cache may convey user options to the network cache, e.g., delivery start times or deadlines for certain content, frequency of regular downloads, etc., which the network cache will take into consideration when making the decision to transfer the content.

Another characteristic of the novel transfer between the network and the user terminal is that the transfer may be based on its access type. For example, the mobile user may prefer that certain high-volume content be downloaded only when there is public WiFi coverage in order to avoid high transfer fees. For this situation, the user cache informs the network cache about the access type and/or changes in the access type. Thus, the network cache knows when to activate the content transfer based on the access type and/or the network conditions.

Still another aspect of the novel transfer is related to the mobile terminal capability to receive and process content. For example, in one exemplary embodiment, in order to optimize the battery lifetime, the user may choose to receive delayed content only when the mobile terminal is on a charger. Thus, the user cache may be configured to transmit this information to the network cache. Other terminal status information, e.g., current user profile, central processing unit (CPU) load, etc. may also be used to determined a time of the content transfer.

Still with reference to the user cache, it is noted that although the user cache is not owned by the network operator, this does not preclude pre-fetch of content by the operator that has not been previously requested by the subscriber, i.e., based on anticipated subscriber behaviour. This approach offers the user the opportunity to immediately access data without download delay, even in areas with bad or no coverage. Copyrighted content delivery may also be handled in this way, e.g., some number of bytes (e.g., in form of digital signature) will be delivered only upon user request. The novel architecture may also be used for the delivery of targeted advertisements, i.e., some type of advertisements may be pre-loaded to the client and served from the user cache upon certain user actions, e.g., visiting a web page or showing up at a predetermined location, e.g., in a supermarket.

Figure 3:
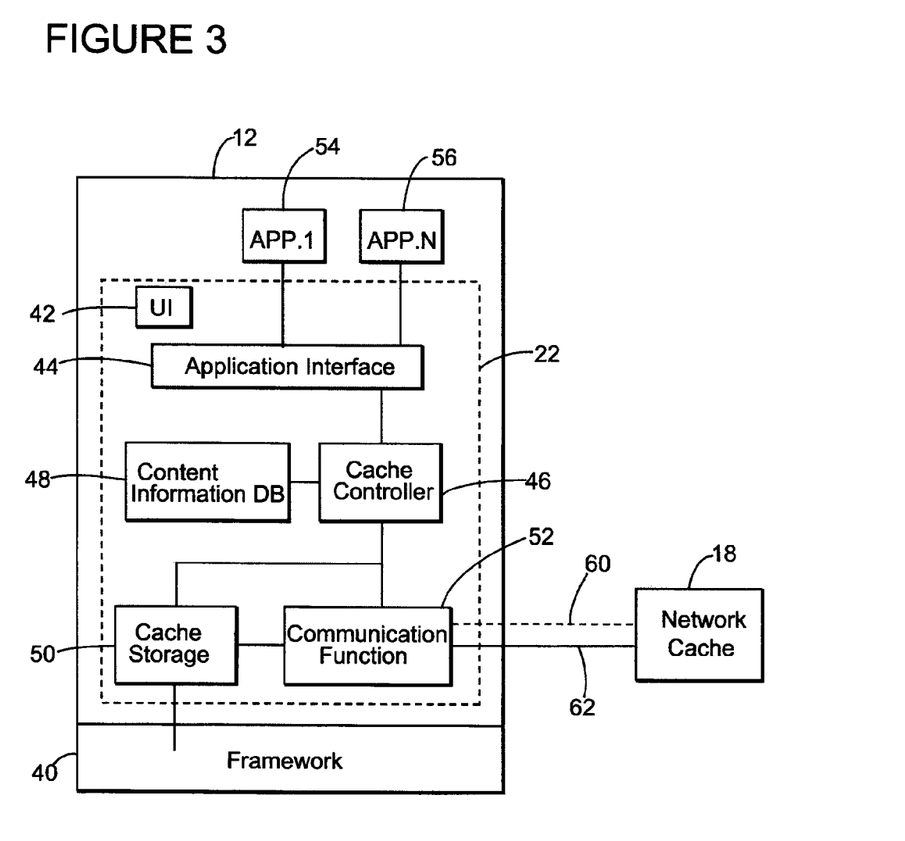
FIG. 3 is a schematic diagram of a user terminal in which a user cache is implemented according to an exemplary embodiment.

An example of a possible user terminal architecture is shown in FIG. 3 with regard to an Android phone. The architecture may be implemented on top of the Android framework 40. The user cache implementation includes the following modules: user interface (UI) 42, application interface 44, cache controller 46, content information DB 48, cache storage 50, and communication function 52.

The UI 42 may be used by the end user to manually input pre-fetch/delayed-upload requests, or to receive notifications from the user cache. The UI can be implemented as an Activity component which is provided by the Android system. The application interface 44 interacts with local applications 54 and 56 that run on the Android phone. Some functions of the application interface include: sending a request from various applications to the cache controller 46; querying the status of the requested content; and getting the cached content or location of the content from the cache controller.

The cache controller 46 is the core module of the user cache 22. Some of the functions of the cache controller 46 include: receiving the content request coming through UI or application interface and maintaining the status of the request; writing and reading content and request related information into the content information database 48; sending content request to the network cache 18 through the communication function 52; and providing access control for content stored in the cache storage 50.

In the Android system, the cache controller 46 may be implemented as a service class which is running in the background. The cache controller can use an 'Intent' mechanism and a local socket for the communication between it and UI/applications. The content information DB 48 may contain the information of the content requested by the user or the applications 54 and 56. This database may be implemented as a 'ContentProvider' class and may use the SQLlite interface provided by Android.

The communication function 52 may provide signaling 60 and data transfer 62 between the user cache 22 and the network cache 18 as described later. The signaling may be implemented with the transmission control protocol (TCP) socket and the data transfer may use the built-in hypertext transfer protocol (HTTP) method of Android. The cache storage 50 is configured to store all contents downloaded from the network. The cache storage 50 may be in a directory of the Android file system. For each content, a local file may be created and stored in the specified directory. The file path and name may be stored in the content information DB 48 in which the access can be controlled by the cache controller 46.

As noted above, see FIG. 4, the interface 24 between the user cache 22 and the network cache 18 ensures that content is exchanged by these entities. The interface 24 has a twofold role. The interface 24 acts (i) as a control interface for enabling a delayed data transfer and related information between the user and the network for optimal radio usage, but it also acts (ii) as an interface for transferring the content. The later role may in general be implemented as an HTTP interface and it may be supported by a proxy cache in the network cache. The former role is used, for example, to convey the information related to the content to be transferred, policies to be applied (e.g., deadlines) and current transfer states so that the network cache triggers and controls the content download.

The interaction between the client and network cache may include a request for new content initiated by the client; a request for new content initiated by the network cache, e.g., during web acceleration, video pre-fetch, context-based pre-fetch etc.; a request from the network cache to activate/deactivate download of a specific content requested earlier by the client; get and update client status including UE location (e.g., cell ID), wireless connection type, radio conditions experienced by the UE, charging status/battery level of the UE; and a synchronization of a list of requested content information and its transfer status (e.g., when the client's device is rebooted during the content transfer).

Figure 4:
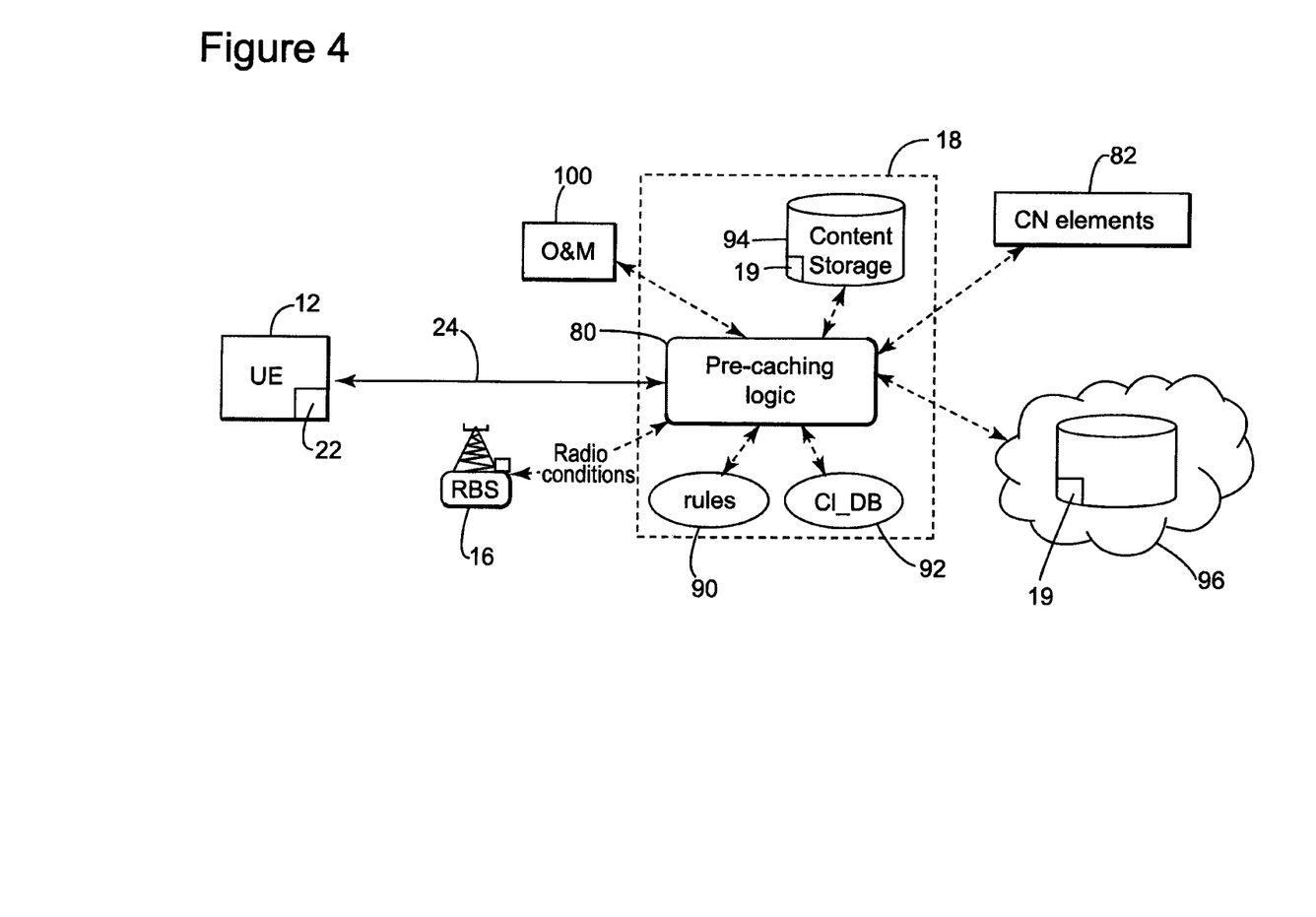
FIG. 4 is a schematic diagram of a network cache implemented in a communication network according to an exemplary embodiment.

An exemplary implementation of the network cache 18 is shown in FIG. 4. FIG. 4 shows the user terminal 12, the network cache 18 and an external server 96 that may originally store the delay-tolerant content 19. Although the following embodiment refers to delay-tolerant data content it is noted that the novel architecture equally applies to data that is transferred in advance of a user request, i.e., in-advance data content. The network cache 18 is configured to receive the content 19 and store it in a content storage 94 that will be discussed later. Some of the components of the network cache 18 are now discussed. The network cache 18 may include a pre-caching logic module 80. This module is in charge of controlling the data transfer between the user cache 22 and the network cache 18. For achieving this function, the pre-caching logic module 80 interfaces with the user cache 22 as previously discussed, with external portals, and also with radio access network (RAN) nodes 16 controlling the mobile radio interface.

In addition, the module 80 also interfaces with core network (CN) elements 82, e.g., policy and charging rules functions (PCRF), or an authentication server to receive an authentication and authorization information for a specific user and/or service. One of these interfaces may also be used to obtain information about the whereabouts of the individual users. The module 80 may also interface with a component (operation and management module 100) of the core network to receive the proper configuration of the network and/or to send performance information.

The network cache 18 also includes a rules module 90. The rules module 90 may be a database containing rules and algorithms for delivering the content based on different criteria like, for example, current radio conditions (e.g., available radio capacity, number of active users, channel quality indicator (CQI) of individual UEs), deadline for content delivery, UE status (e.g., on charger or not), etc. The network cache 18 may also include content information database 92 which contains the information of the content requested by the user or its applications that should be served to the different clients.

The network cache 18 may also include a content storage 94, which is a component that is configured to temporarily store the user desired content and to serve the content to the user cache 22 when needed. The network cache 18 may also include a WEB-portal adaptation module that provides a portal-specific interface to a browser of the user terminal 12 to enable user-generated content requests.

Having now discussed some possible implementations of the user cache, the network cache and the interface between them, various functionalities associated with this novel architecture are now discussed. According to an exemplary embodiment illustrated in FIG. 5, a user 11 may decide the content desired to be viewed. An identifier (e.g., URL) of this content is input, for example, through the UI 42 to the user cache 22 in step 500. The user cache 22 then informs in step 502 the network cache 18 about the URL of the desired content. The network cache 18 downloads in step 504 the desired content from the server 96. The server 96 may be part of the communication network or may be a server of a third party. The network cache 18 receives information (discussed above) related to the user terminal 12 in step 506 and information related to the base station or cell in step 508. Based on this information, the network cache 18 decides in step 510 at what time the user cache can download the desired content from the network cache. Of course, as already discussed above, this time may take into consideration not only characteristics of the network but also characteristics of the user terminal. When this time has arrived, the network cache 18 instructs in step 512 the user cache 22 to download the desired content. The user cache 22 downloads the desired content in step 514 and an application 54 selected by the user is used in step 516 to consume (e.g., watch) the desired content.

Figure 5:
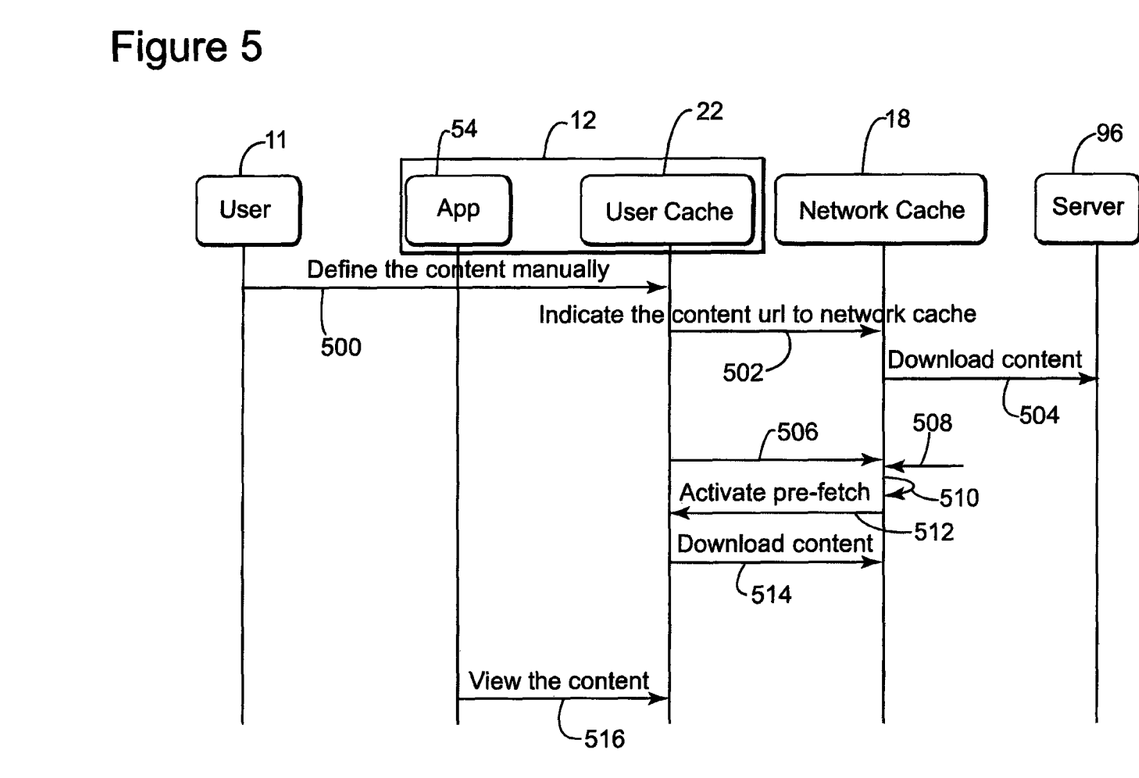
FIG. 5 is a schematic diagram of steps executed by a user cache and a network cache for downloading content from a third party according to an exemplary embodiment.

The user may have a specific interface to the system that allows him or her to configure, for example, repetitive download. This function may be using both a history of what the user has previously downloaded and an explicit selection by the user. If the radio coverage in the area where the user is present is poor or with not sufficient throughput for high quality video, a background download is desired. Thus, the functionality discussed with regard to FIG. 5 is appropriate for these situations.

The user interface may include an url, i.e., a starting point of selection; a marking for urls that should be pre-cached; a content category selection between categories in the web-portal; a repetitive download (per day, per week, when content is found . . . ); and a time (i.e., wall-clock) for viewing, reading, playing the content. There are many examples of content that can be downloaded, i.e., Youtube content, but also news portal, TV-program, video-content with HQ.

If the user wants to receive some contents pre-cached in the mobile device, the contents may be defined by the user manually. For example, the method discussed with regard to FIG. 5 is appropriate if the user wants to view a popular video from Youtube and the user does not want to view it immediately but rather at later time.

Then the user requests the user cache through the user interface to pre-cache the video within a specified period. The user cache requests the network cache to fetch the video for the given url. When the radio network has adequate resources to transmit the video, the network will trigger the mobile client to fetch the video from the network cache (or the content source). When the user starts to view the video, the video player will play it from the user cache instead of the network cache.

Another situation in which the novel architecture may be used is when the user generates the content and wants to upload it on the network. For example, the user records a video clip and wants to upload it on Youtube. This is the opposite of the previous embodiment in which the content is generated by a third party and the content is transferred from the network cache to the user cache.

Figure 6:
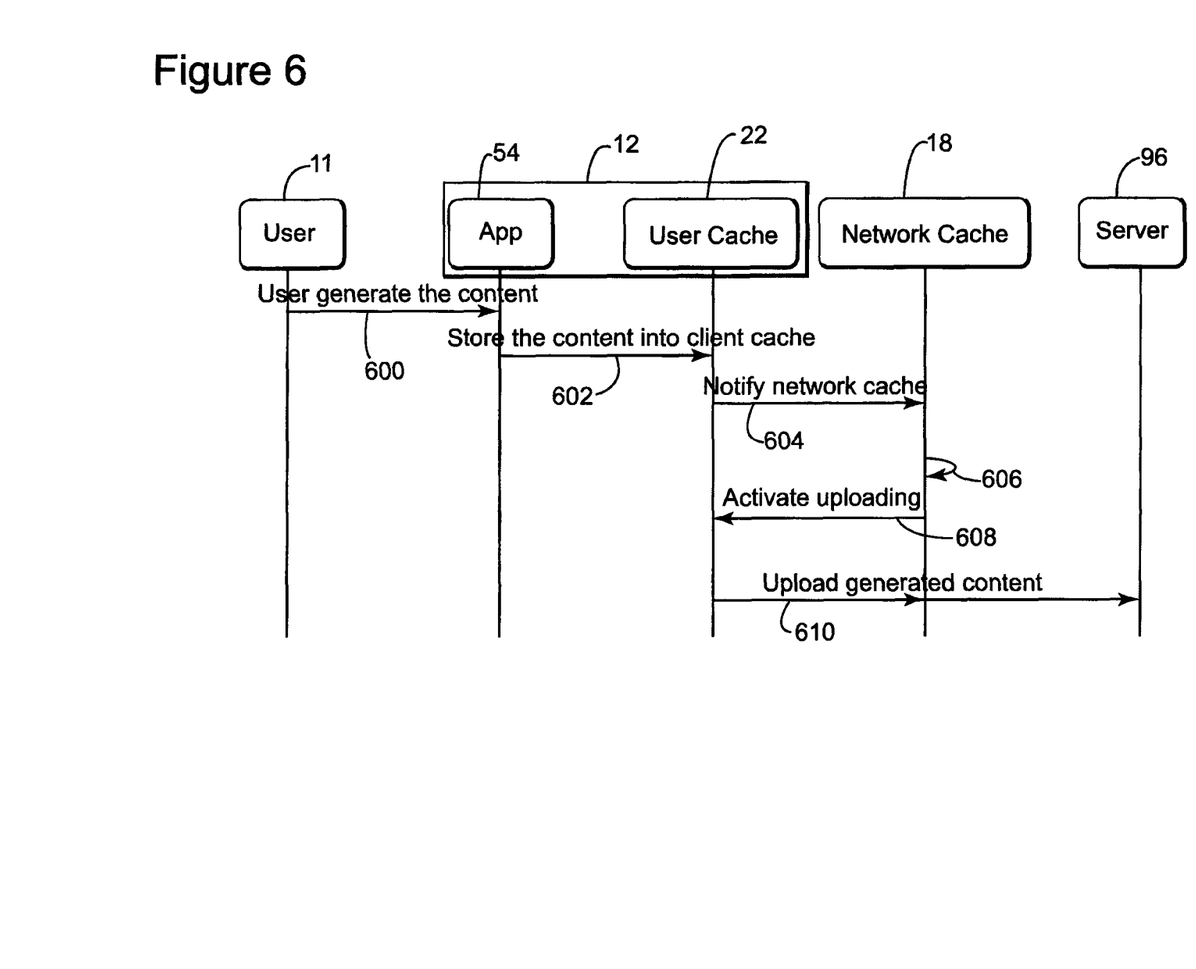
FIG. 6 is a schematic diagram of steps executed by a user cache and a network cache for uploading content according to an exemplary embodiment.

As illustrated in FIG. 6, the user generates the content in step 600 by using an application 54. The generated content is then stored in the user cache 22 in step 602. The user cache 22 notifies in step 604 the network cache 18 that content is stored in the user cache and the content needs to be transferred to the network cache. The network cache 18 determines in step 606 when the conditions of the network are appropriate and when the conditions of the user terminal, if the case, are also appropriate for the transfer. When this is happening, the network cache 18 sends a notification in step 608 to the user cache 22 that the content may be transferred and in step 610 the content is transferred from the user cache to the network cache and/or directly to a desired server 96. The desired server 96 may be a third party serve, e.g., Youtube (public site), or may be part of a cloud storage (private or closed subscription group).

It is noted that in any of the exemplary embodiments discussed herein it is possible that the conditions required by the user clashes with the conditions of the network. For example, it is possible that the user requests that content is downloaded or uploaded when the user terminal is connected to a power source but at the same time the load conditions of the network are at their peak. In these situations, the network terminals makes the final decision of when to transfer the content and the load conditions of the network take precedence over the conditions of the user terminal or over the requests of the user.

Another example for using the novel architecture is related to a backup service. For example, mobile phones and laptops have an increased amount of storage. The storage includes important information which is created by the clients by using various applications. One of the problem is therefore to backup the content in the phone such that the content can survive if something happens with the phone. A service offered by the operator is the backup-service and a re-store service. These services may be implemented similar to the method illustrated in FIG. 6.

Figure 7:
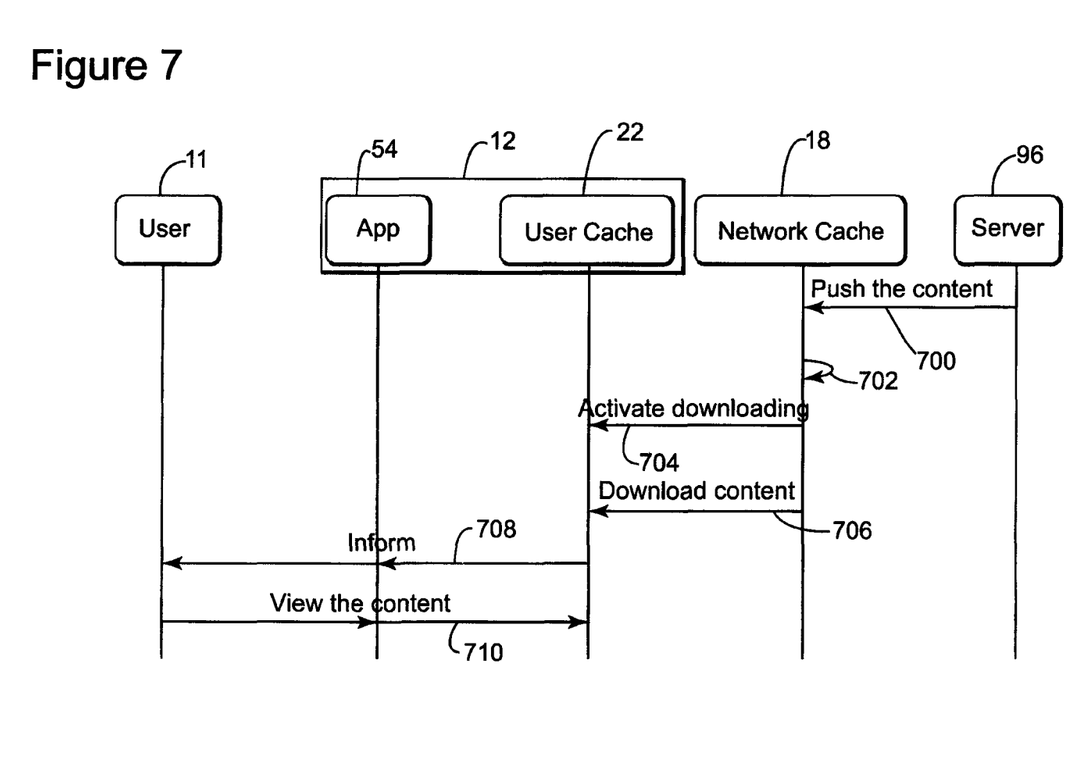
FIG. 7 is a schematic diagram of steps executed by a user cache and a network cache for pushing content according to an exemplary embodiment.

Still another example for using the novel architecture is related to a push service as illustrated in FIG. 7. In this case, the service is pushed from the service provider to the user. For example, many mobile operators in various countries provide mobile newspaper service. Such a service functions in the following way. After the user has subscribed to a push service, e.g., mobile newspaper, the server 96 pushes in step 700 the content to the network cache 18. In step 702, the network cache determines whether the conditions of the network are appropriate for transferring the content to the user cache 22. Also, the network cache may consider the requests and conditions of the user cache. When the network condition is good, the network cache sends in step 704 a notification to the user cache to activate the downloading. The user cache downloads in step 706 the content from the network cache and informs in step 708 the user that the content is available for consumption. When the user decides to view the content, an appropriate application loads in step 710 the content from the user cache.

To illustrate the bandwidth gain to be obtained if implementing the new architecture discussed above in the context of the existing telecommunication networks, it is noted that the average cell load is many times smaller than the maximum cell load for a heavily loaded network. This difference may then be "filled in" with delay-tolerant traffic or in-advance data traffic using the user cache and the network cache architecture discussed above.

Figure 8A:
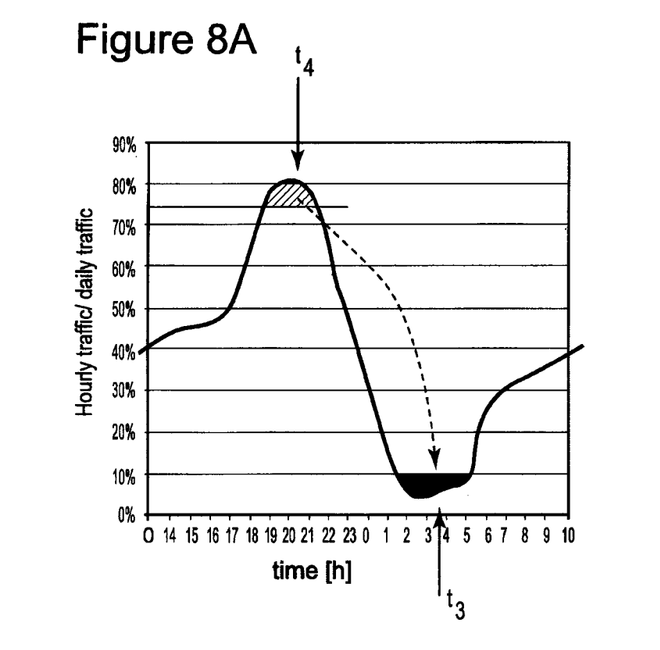
FIG. 8A is a graph illustrating an improved traffic when using a delayed download according to an exemplary embodiment.
Figure 8B:
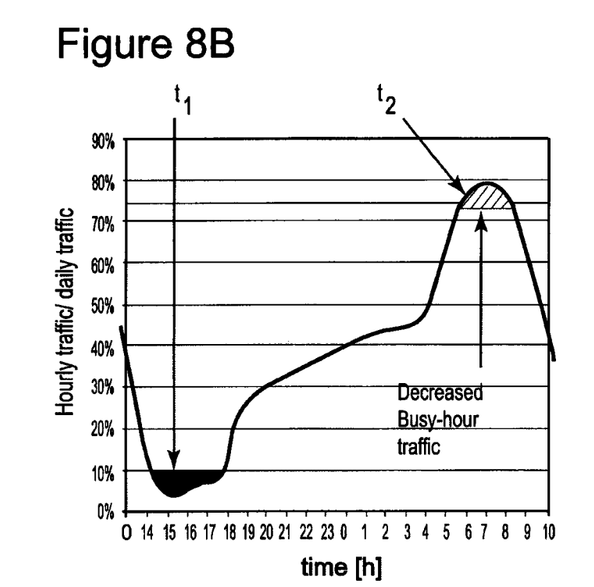
FIG. 8B is a graph illustrating an improved traffic when using pre-fetch according to an exemplary embodiment.

This concept of "filling in" is illustrated in FIGS. 8A-B. Two techniques may achieve this advantage, e.g., the pre-caching and the delay-tolerant transfer. In the former case, which is illustrated in FIG. 8B, the content is transferred at time t1 to the user cache, prior to be requested (or "consumed") by the user at time t2; in the latter case, which is illustrated in FIG. 8A, the transfer from the network (e.g., a network cache) happens at time t3, after the request was issued at time t4, e.g., at a time when there are sufficient available radio resources. The achievable gain depends on how long the response time may be, but as the figures show, a certain gain is observed.

Figure 9:
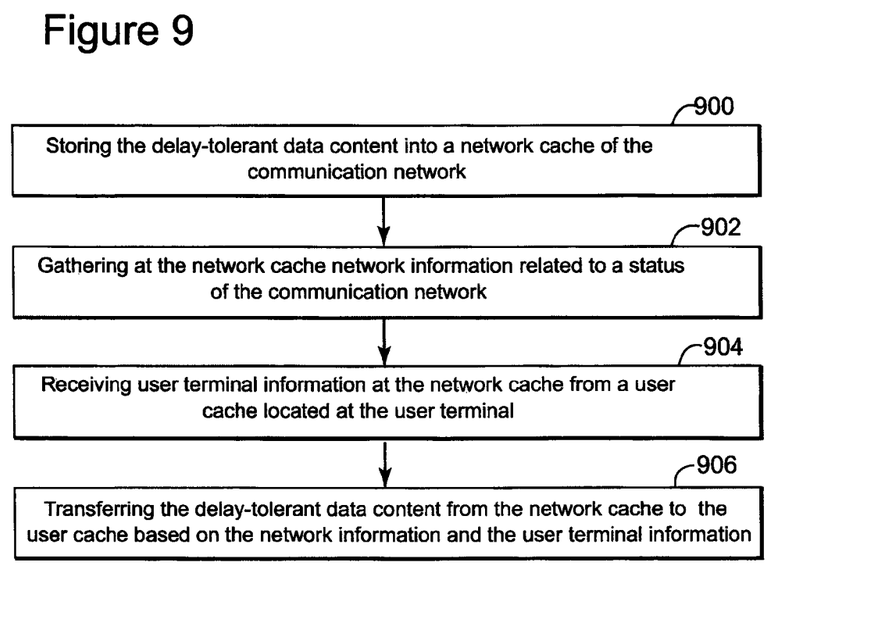
FIG. 9 is a flow chart of a method for exchanging traffic between a user cache and a network cache according to an exemplary embodiment.

According to an exemplary embodiment, a method for exchanging delay-tolerant data content between a user terminal and a communication network with which the user terminal communicates may be implemented as illustrated in FIG. 9. The method includes a step 900 of storing the delay-tolerant data content into a network cache of the communication network; a step 902 of gathering at the network cache network information related to a status of the communication network; a step 904 of receiving user terminal information at the network cache from a user cache located at the user terminal; and a step 906 of transferring the delay-tolerant data content from the network cache to the user cache based on the network information and the user terminal information.

Therefore, the above discussed embodiments may provide certain advantages to the various parties that are involved in the data transfer as discussed next. For example, the content provider may improve a guarantee of delivery of the content by operator controlled transfer to the user cache. The operator of the network may use more efficiently the available radio resources by transferring data to the client when "free capacity" is available or when radio conditions are "optimal." This means that the network operator may have the opportunity to offer new services to the subscribers, e.g., a "lower than best-effort service" (LBE-service) for delayed upload/download.

The users may see an improved quality of experience (QoE) as the network makes the content faster accessible to the client by pre-fetch. There is also a possibility that the user controls when the content is transferred. The performance of non-delayed sessions (e.g., video streaming) may also be improved (e.g., by pre-fetching additional partial video content to the client cache when the radio conditions allow). The novel architecture may also achieve lower cost per bit, e.g., assuming LBE-service for some delayed upload or download offered by the operator.

General advantages of the novel architecture may include the fact that there is no need to require explicit operator ownership of the user cache in the client and new opportunities are offered for application designers.

Figure 10:
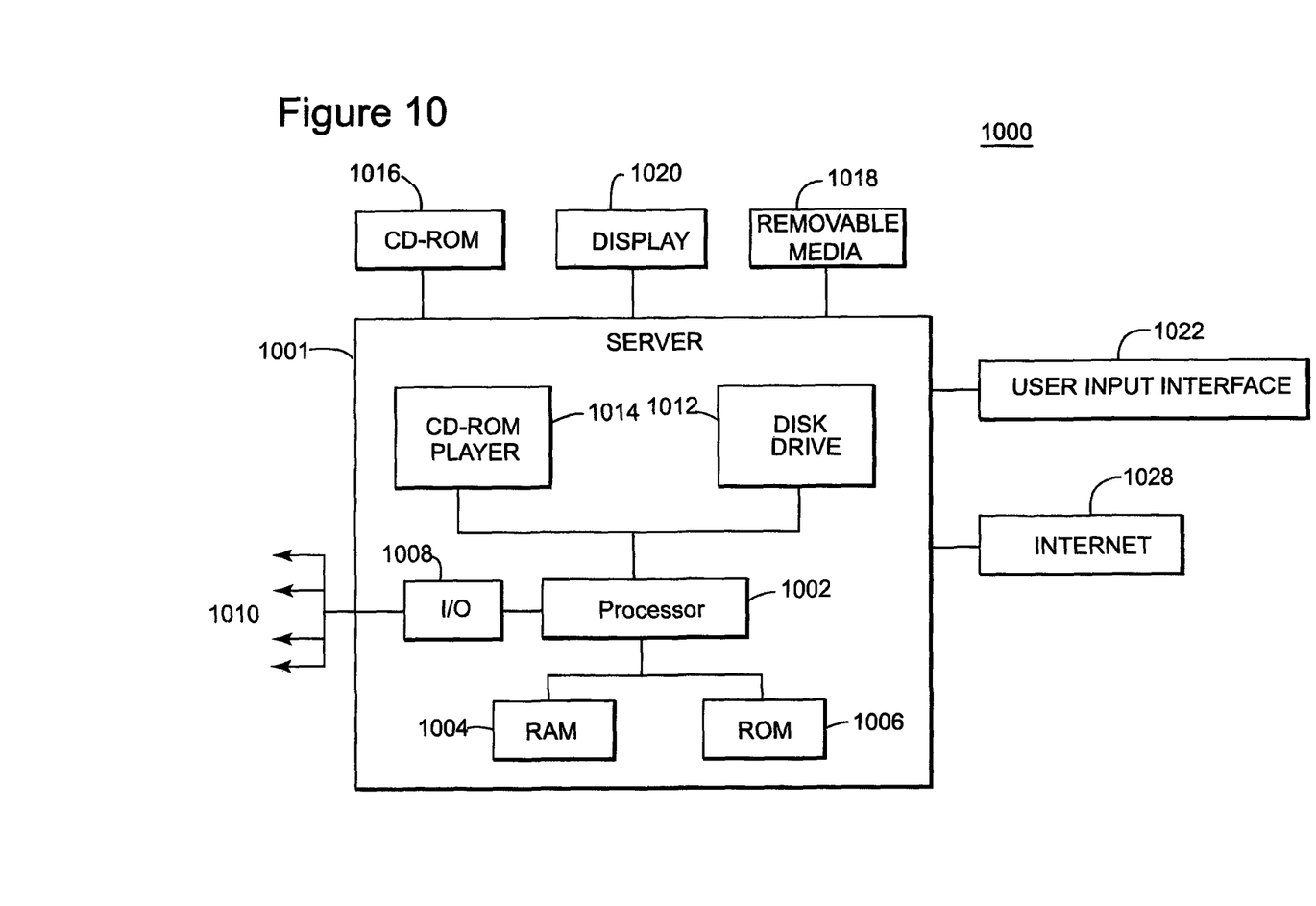
FIG. 10 is a schematic diagram of a cache.

For purposes of illustration and not of limitation, an example of a representative mechanism and/or cache capable of carrying out operations in accordance with the exemplary embodiments is illustrated in FIG. 10. Hardware, firmware, software or a combination thereof may be used to perform the various steps and operations described herein.

The exemplary mechanism/cache 1000 suitable for performing the activities described in the exemplary embodiments may include a server 1001. Such a server 1001 may include a central processor (CPU) 1002 coupled to a random access memory (RAM) 1004 and to a read-only memory (ROM) 1006. The ROM 1006 may also be other types of storage media to store programs, such as programmable ROM (PROM), erasable PROM (EPROM), etc. The processor 1002 may communicate with other internal and external components through input/output (I/O) circuitry 1008 and bussing 1010, to provide control signals and the like. The processor 1002 carries out a variety of functions as is known in the art, as dictated by software and/or firmware instructions.

The server 1001 may also include one or more data storage devices, including hard and disk drives 1012, CD-ROM drives 1014, and other hardware capable of reading and/or storing information such as DVD, etc. In one embodiment, software for carrying out the above discussed steps may be stored and distributed on a CD-ROM 1016, removable media 1018 or other form of media capable of portably storing information. These storage media may be inserted into, and read by, devices such as the CD-ROM drive 1014, the disk drive 1012, etc. The server 1001 may be coupled to a display 1020, which may be any type of known display or presentation screen, such as LCD displays, LED displays, plasma display, cathode ray tubes (CRT), etc. A user input interface 1022 is provided, including one or more user interface mechanisms such as a mouse, keyboard, microphone, touch pad, touch screen, voice-recognition system, etc.

The server 1001 may be coupled to other computing devices, such as the landline and/or wireless terminals, via a network. The server may be part of a larger network configuration as in a global area network (GAN) such as the Internet 1028, which allows ultimate connection to the various landline and/or mobile client/watcher devices.

The disclosed exemplary embodiments provide a cache, a method and a computer program product for preventing a packet channel to time out when a user terminal receives content from a cache located downstream from a core network of a communication network. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer readable medium may be utilized including hard disks, CD-ROMs, digital versatile disc (DVD), optical storage devices, or magnetic storage devices such a floppy disk or magnetic tape. Other non-limiting examples of computer readable media include flash-type memories or other known memories.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a specifically programmed computer or processor.

What is claimed is:

1. A method for exchanging delay-tolerant data content or in-advance data content between a user terminal and a communication network with which the user terminal communicates, the method comprising:
storing the delay-tolerant data content or in-advance data content into a network cache of the communication network;
gathering at the network cache network information related to a status of the communication network;
receiving user terminal information at the network cache from a user cache located outside the communication network at the user terminal, wherein the user cache is controlled only by the user terminal and the user terminal information contains information about conditions determined by the user terminal that affect when transfer of the delay-tolerant data content or the in-advance data content should occur; and
transferring the delay-tolerant data content or in-advance data content from the network cache to the user cache based on a determination by the network cache using both the network information and the user terminal information.

2. The method of claim 1, wherein the network information includes at least one of available radio capacity, number of active users in the individual cells, and channel quality indicator of individual user terminals.

3. The method of claim 2, further comprising:
receiving at the network cache the network information directly from a radio access network of the communication network.

4. The method of claim 1, wherein the user terminal information includes at least one of a delivery start time, a deadline, a frequency of regular downloads, an access type of the user terminal to Internet, a battery lifetime, a charging status, a current user profile, and a processor load.

5. The method of claim 1, further comprising:
transferring the delay-tolerant data content or in-advance data content from the network cache to the user cache when an available cell throughput is above a predetermined threshold or when a lower than best-effort service is implemented.

6. The method of claim 1, further comprising:
downloading the delay-tolerant data content or in-advance data content from a server to the network cache based on a request from the user terminal.

7. The method of claim 1, wherein the in-advance data content is transferred to the user cache before the user requests it.

8. The method of claim 1, further comprising:
downloading the delay-tolerant data content or in-advance data content from a server to the network cache based on a push service of the server.

9. The method of claim 1, further comprising:
receiving at the network cache information from a core network regarding the user terminal.

10. A communication network to which a user terminal is connected for exchanging delay-tolerant data content or in-advance data content, the communication network comprising:
a network cache configured to store the delay-tolerant data content or in-advance data content; and
a pre-caching logic module disposed within the network cache and in communication with a user cache located outside the communication network at the user terminal, wherein the user cache is controlled only by the user terminal, and wherein the pre-caching logic module is configured to,
gather network information related to a status of the communication network,
receive user terminal information from the user cache, wherein the user terminal information contains information about conditions determined by the user terminal that affect when transfer of the delay-tolerant data content or the in-advance data content should occur, and
decide when to transfer the delay-tolerant data content or in-advance data content from the network cache to the user cache based on the network information and the user terminal information.

11. The communication network of claim 10, wherein the network information includes at least one of available radio capacity, number of active users in the individual cells, and channel quality indicator of individual user terminals.

12. The communication network of claim 11, further comprising:
a radio access network and the network cache receives the network information directly from the radio access network.

13. The communication network of claim 10, wherein the user terminal information includes at least one of a delivery start time, a deadline, frequency of regular downloads, an access type of the user terminal to Internet, a battery lifetime, a charging status, a current user profile, and a processor load.

14. The communication network of claim 10, wherein the pre-caching is configured to transfer the delay-tolerant data content or in-advance data content from the network cache to the user cache when an available bandwidth is above a predetermined threshold or when a lower than best-effort service is implemented.

15. The communication network of claim 10, wherein the delay-tolerant data content or in-advance data content is downloaded from a server to the network cache based on a request from the user terminal.

16. The communication network of claim 15, wherein the in-advance data content is transferred to the user cache before the user requests it.

17. The communication network of claim 10, wherein the delay-tolerant data content or in-advance data content is downloaded from a server to the network cache based on a push service of the server.

18. The communication network of claim 10, further comprising:
a core network configured to provide to the network cache information regarding the user terminal.

19. A network cache in a communication network to which a user terminal is connected for exchanging delay-tolerant data content or in-advance data content, the network cache comprising:
a storage device configured to store the delay-tolerant data content or in-advance data content; and
a pre-caching logic module in communication with the storage device and configured to,
gather network information related to a status of the communication network,
receive user terminal information from a user cache in communication with the pre-caching logic module and located outside the communication network at the user terminal, wherein the user cache is controlled only by the user terminal and the user terminal information contains information about conditions determined by the user terminal that affect when transfer of the delay-tolerant data content or the in-advance data content should occur, and
decide when to transfer the delay-tolerant data content or in-advance data content from the network cache to the user cache based on the network information and the user terminal information.

20. A method for exchanging delay-tolerant data content or in-advance data content between a user terminal and a communication network with which the user terminal communicates, the method comprising:
storing the delay-tolerant data content or in-advance data content into a user cache located outside the communication network in the user terminal, wherein the user cache is controlled only by the user terminal;
gathering at the network cache network information related to a status of the communication network;
receiving user terminal information at the network cache from the user cache, wherein the user terminal information contains information about conditions determined by the user terminal that affect when transfer of the delay-tolerant data content or the in-advance data content should occur; and
deciding when to transfer the delay-tolerant data content or in-advance data content from the user cache to the network cache based on a determination by the network cache using both the network information and the user terminal information.

21. A user cache in a user terminal connected to a communication network for exchanging delay-tolerant data content or in-advance data content, wherein the user cache is located outside of the communication network and is controlled only by the user terminal, the user cache comprising:
a user interface configured to receive input from a user of the user terminal regarding the delay-tolerant data content or in-advance data content;
a storage device configured to store the delay-tolerant data content or in-advance data content;
an application interface configured to interact with an application stored on the user terminal;
a cache controller connected to the application interface and the storage device for controlling the delay-tolerant data content or in-advance data content; and
a communication function module connected to the cache controller and to a network cache and configured to send information related to the user terminal and to receive the delay-tolerant data content or in-advance data content, wherein the information related to the user terminal contains the input from the user of the user terminal regarding the delay-tolerant data content or the in-advance data content and information about conditions determined by the user terminal that affect when transfer of the delay-tolerant data content or the in-advance data content should occur.

* * * * *